No. 611,339. Patented Sept. 27, 1898.
C. A. SHOPTAUGH.
APPARATUS FOR INFLATING PNEUMATIC TIRES.
(Application filed Feb. 18, 1898.)
(No Model.) 2 Sheets—Sheet 1.
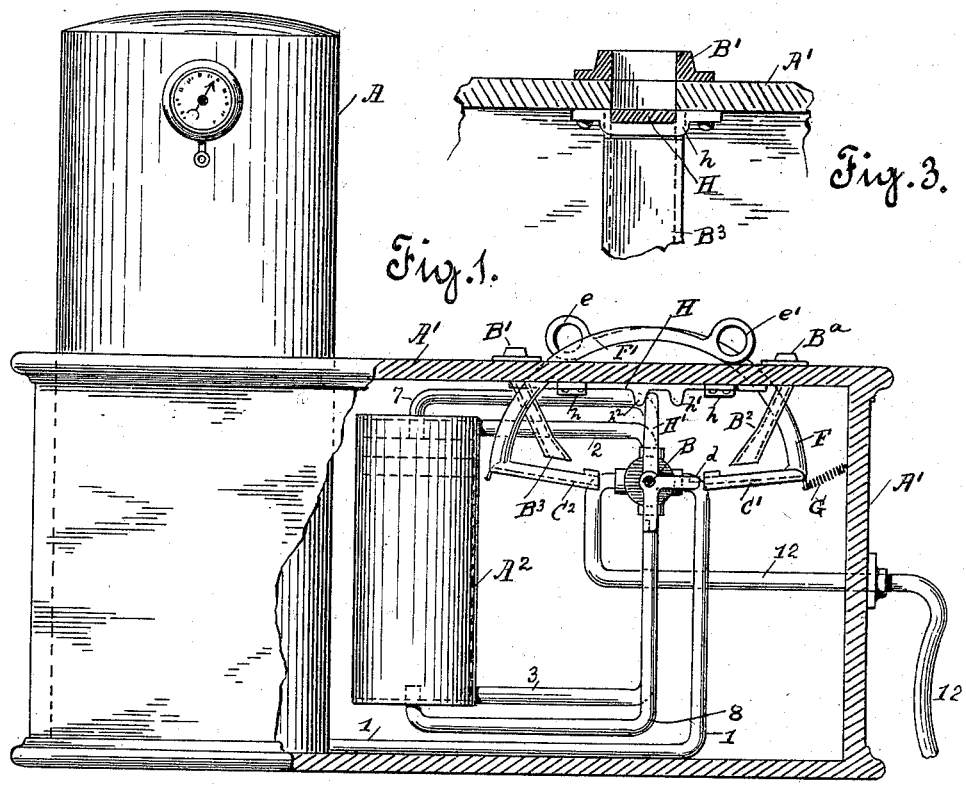

No. 611,339. Patented Sept. 27, 1898.
C. A. SHOPTAUGH.
APPARATUS FOR INFLATING PNEUMATIC TIRES.
(Application filed Feb. 18, 1898.)
(No Model.) 2 Sheets—Sheet 2.
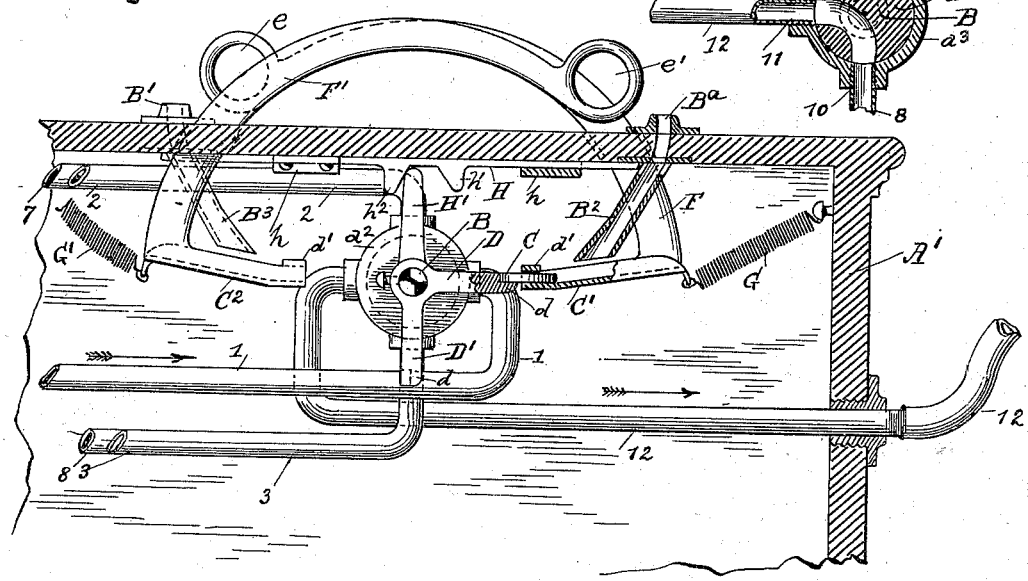
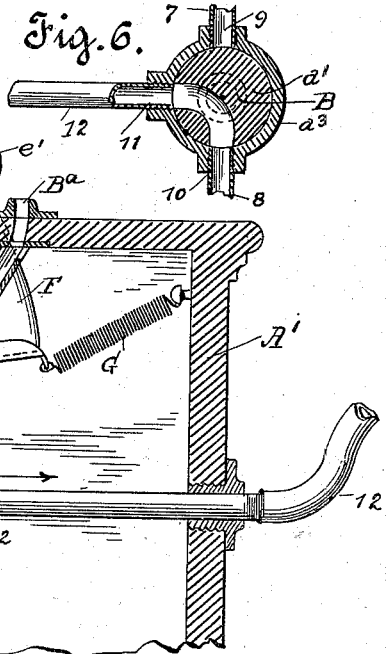
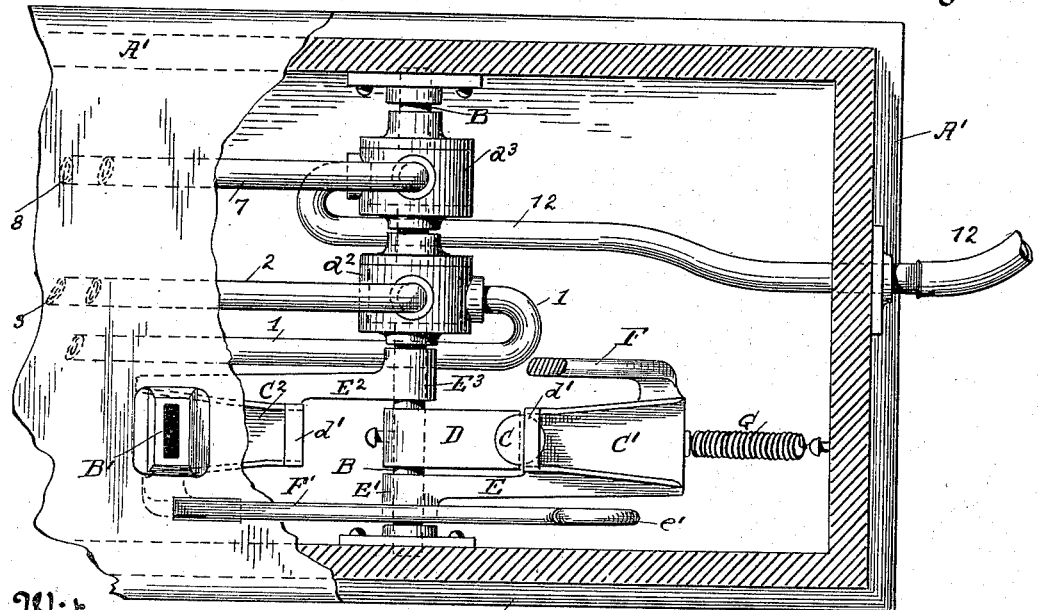
Witnesses.
T. E. Monteverde.
Elmer Wickes.
Inventor.
C. A. Shoptaugh
by N. G. Acker
his atty.

UNITED STATES PATENT OFFICE.

CURTIS A. SHOPTAUGH, OF SAN FRANCISCO, CALIFORNIA.

APPARATUS FOR INFLATING PNEUMATIC TIRES.

SPECIFICATION forming part of Letters Patent No. 611,339, dated September 27, 1898.

Application filed February 18, 1898. Serial No. 670,746. (No model.)

*To all whom it may concern:*

Be it known that I, CURTIS A. SHOPTAUGH, a citizen of the United States, residing at San Francisco, in the county of San Francisco and State of California, have invented certain new and useful Improvements in Apparatus for Inflating Pneumatic Tires; and I do hereby declare that the following is a full, clear, and exact description thereof.

This invention relates to a certain new and useful apparatus for filling or inflating the tires of bicycles, said device being operated through the medium of a coin or token deposited therein; and the same consists in the arrangement of parts and details of construction, as will be hereinafter fully set forth in the drawings and described and pointed out in the specification.

The object of the invention is to provide a simple and inexpensive device for inflating the tires of bicycles, the device being so constructed that the rider of the bicycle, after coupling the filling-tube to the tire of the bicycle, may have the tire inflated upon the payment of a small sum of money—say one cent. By providing a number of the machines a distance apart in cities or on roadways a series of filling-stations is provided at which the tire of the bicycle may be inflated. The device is of such a nature that no attendant is required to operate the machine, the only requirement being that the owner of the bicycle deposit a small coin or token therein in payment of air and then pull down upon the handle in order to turn the valves, so as to permit the discharge of air under a given pressure from the apparatus into the tires of the bicycle.

To comprehend the invention reference must be had to the accompanying sheets of drawings, wherein—

Figure 1 is a side view in elevation, partly broken away, of the apparatus. Fig. 2 is a vertical sectional view of the supplemental tank, disclosing the arrangement of the air-inlet and the air-outlet pipes. Fig. 3 is a broken detail view of the casing-top, showing one of the coin-deposit slots and one of the coin-runways. Fig. 4 is a broken sectional view of the casing, illustrating the coin mechanism, one of the valve-casings, and a portion of the pipe connections. Fig. 5 is a broken top plan view of the mechanism illustrated by Fig. 4, and Fig. 6 is a vertical sectional view of one of the rotatable valves and casing and air inlet and outlet pipes.

In the drawings the letter A is used to indicate the main tank or reservoir, into which air is introduced under a given pressure, said air being stored in the main tank or reservoir for use in inflating the tire of the bicycle, the pressure thereof being greater than that required in the tire. This main tank or reservoir is maintained full of air under pressure in any suitable manner, and the tank or reservoir is preferably fitted within a casing A', which incloses a supplemental tank $A^2$ and the operating mechanism for releasing the air. The supplemental tank $A^2$ is considerably smaller than the main tank or reservoir, the size being such as to hold such a quantity of air as will inflate one or two tires of a bicycle. Air is conveyed from the main tank or reservoir into the supplemental tank by means of the pipe connections 1 2 3, the flow of air being controlled by the hereinafter-described valve mechanism.

Within the casing A' works the transverse shaft B, which shaft is formed or provided with the valves $a$ $a'$. These valves work within the valve-casings $a^2$ $a^3$. The valve-casing $a^2$ is provided with the inlet port or opening 4 and the outlet ports or openings 5 6, to which the pipes 1, 2, and 3 connect, respectively, the opposite end of said pipes connecting, respectively, with the main tank or reservoir and the top and bottom of the supplemental tank $A^2$, Figs. 1 and 2. Through the top and bottom of said supplemental tank slightly project the outlet-pipes 7 8, the opposite ends of which pipes connect, respectively, with the inlet ports or openings 9 10, formed in the valve-casing $a^3$. To the outlet port or opening 11 of said casing connects the inner end of the feed or filling pipe 12, the outer end of which pipe extends through the casing A', so as to be free to connect with the filling-valve of the bicycle-tire.

Through the valve $a$ is cut the passage-way $b$, which when the said valve is rotated registers so as to form communication between either ports or openings 4 5 or 4 6 of the valve-casing, so as to permit of air flowing through pipes 1 2 into the top of the supplemental tank or through pipes 1 3 into the bottom of said tank, while through the valve $a'$ is cut the passage-way $b'$, which when the said valve is rotated registers so as to form communication between either ports or openings 10 11 or 9 11 of the valve-casing $a^3$, in order to permit the escape of air from the supplemental tank through the pipes 8 12 or 7 12 into the tire of the bicycle when the outer end of pipe 12 is connected with the filling-valve of the bicycle.

In the present drawings I have shown a simple and inexpensive coin-actuated mechanism by which the present apparatus is operated, although I do not wish to be understood as confining myself to said form of coin mechanism, as I am well aware that any suitably-controlled mechanism may be employed.

Through the top of the casing $A'$ are formed, a distance apart, two coin openings or slots $B^a$ $B'$, which permit a coin or token, such as a check, inserted therein to drop into one of the runways $B^2$ $B^3$, located within the casing $A'$ below the respective slots $B^a$ $B'$, Figs. 1 and 4. These runways convey and deposit the coin or token C into the inclined pans $C'$ $C^2$, placed below the lower end of the runways $B^2$ $B^3$. As the coin or token is deposited within the pan the same slips downward until its movement is checked by engaging shoulder $d$, cut in the outer end of the arms D D', which project at a right angle from the hub $D^2$, rigidly secured upon the shaft B. Across the lower or inner end of each pan is arranged a band $d'$, under which the coin or token rests when it bears upon the shoulder $d$ of the arms D D'. When one arm is in line with a pan, the other arm projects downward at right angles thereto. Consequently only one arm is in line with a pan at a time. The pan $C'$ is attached to a bracket E, outwardly projecting from a hub $E'$, loosely mounted upon the shaft B, while the pan $C^2$ is supported by a bracket $E^2$, projecting from a hub $E^3$, also loosely mounted upon said shaft, Fig. 5. To the pan $C'$ is attached the lower end of the curved handle F, which handle extends through the top of the casing and is provided with a finger-opening $e$, while to the pan $C^2$ is connected a similar handle F', also provided with a finger-opening $e'$.

Within the supplemental tank $A^2$ is located and works the piston or head $F^2$. This piston or head may be formed of any suitable material and on its upper face is provided with a washer $f$, which when the head or piston is forced upward its full distance bears against the end of the pipe 7, so as to entirely close the same, while on its lower face is secured a washer $f'$, which when the piston or head is forced downward its full distance bears against the end of pipe 8, so as to close same. This piston or head is reciprocated within the supplemental tank by the pressure of the air thereon ejected into the said tank through either of the pipes 7 or 8 back of said piston or head. The air in front of the piston or head is forced from within the tank during the upward or downward movement of the said piston or head, as hereinafter explained. The head or piston is surrounded by the packing-ring $f^2$, which projects slightly above and below the same and forms a close joint with the wall of the tank or cylinder $A^2$.

When desiring to inflate the tire of a bicycle, the rider first couples the projecting end of the pipe or hose 12 to the filling-valve of the tire. A small coin or token of a given value is then placed in one of the deposit slots or openings—say $B^a$. The coin drops into the pan $C'$ from runway $B^2$ and slides forward beneath strap or band $d'$ until its edge rests upon shoulder $d$ of arm D, the coin forming connection or coupling between the receiving pan and arm D, as indicated in Figs. 4 and 5. The depositor of the coin then grasps handle F and forces the same downward its full distance within the casing $A'$. As the handle is attached to the receiving-pan $C'$ the same is moved therewith, causing the bracket E and the hub $E'$ to turn downward. Inasmuch as the coin or token connects the pan $C'$ and the arm D, the said arm will likewise be carried downward. The hub from which the arm projects being secured rigidly to the shaft B the said shaft will be rotated, so as to place the valves $a$ $a'$ in the position illustrated by Fig. 2 of the drawings. As the arm D is moved downward arm D' will be thrown upward until brought into line with the pan $C^2$. The moment the operator releases the handle F the same will be forced or drawn upward by the pressure of the spring G, which is connected to the lower end of the handle and end of the casing. The valves $a$ $a'$ being turned or standing in the position illustrated in Fig. 2 air will flow from the main tank or reservoir A and be conveyed by pipe 1 through valve $a$ into pipe 2, from which it will be discharged into the supplemental tank above the head or piston $F^2$. The pressure of the air upon this head or piston will move the same downward, so as to force the air located within the said tank below the head or piston out through the pipe 8 into the pipe 12, by which it is conveyed to the tire of the bicycle. The air within the supplemental tank below the head or piston will be sufficient to fill both tires of the bicycle, so after one has become filled it is only required to detach the pipe 12 from the filling-valve and connect same with the filling-valve of the other tire. The piston or head will continue to descend until its full downward stroke is made, when all air below the same will be forced out of the said tank. After the piston or head has made its full downward stroke the washer on the under face thereof bears against the end of the pipe 8 projecting into the said tank and closes the same. The apparatus is then in condition for inflating the tires of another wheel, the air within the supplemental tank above the piston or head being sufficient for this purpose. This air is expelled from within the tank by the piston or head being forced upward by the air admitted thereagainst through the pipe 3. In order to admit air into the lower end of the tank, valve $a$ must be turned so as to open communication between pipes 1 and 3 and close port or opening 5 of the valve-casing $a^2$, while valve $a'$ should be turned to open communication between pipes 7 and 12 and close outlet port or opening 10 of the valve-casing $a^3$. This is accomplished by inserting a coin or token in slot or opening B' and forcing handle F' downward within the casing. An opposite rotation is given to the shaft B from that previously described, which rotates the valves, so as to open communication between pipes 1 3 and 7 12. The moment the handle F' is released the same is forced upward by the pressure of spring G', which connects the lower end of the handle to the casing.

Inasmuch as I have two openings within which to drop the coin or token, it is necessary that one be closed against the admission of money or a token while the other remains opened. To accomplish this, a reciprocating plate H works in guides $h$, secured to the under face of the top of the casing, Figs. 1 and 4. This slide-plate is provided with two depending lugs $h'$ $h^2$, which are engaged alternately by the finger H', upwardly projecting from the hub of the arms D D'. As the arm D is thrown downward the finger H' is moved outward, and as it contacts with the lug $h'$ the slide-plate is forced outward and its end moved into a slot cut in the upper end of the runway B², so as to close the deposit-slot B³, while when the arm D' is thrown downward the finger H' is moved inward and as it bears against the lug $h^2$ the slide-plate is carried therewith, so as to uncover the runway B² and close the runway B³ by the free end thereof entering within a slot cut in the upper end of the runway for this purpose. It will thus be noticed that after either handle has been pushed down so as to open the valves the operation of emptying the supplemental tank and filling the same with air is entirely automatic.

The movement of the piston or head within the supplemental tank is due entirely to the pressure of the inflowing air under pressure. Consequently the outflow of air from within the said tank is constant and at a uniform pressure until the predetermined quantity of air is exhausted—that is, all above or below the piston or head, depending upon which direction the said head or piston is moving.

Having thus described my invention, what I claim as new, and desire to secure protection in by Letters Patent, is—

1. In an apparatus for inflating the tires of bicycles, the combination with the main tank or reservoir within which air is stored under pressure, of the supplemental tank or cylinder which holds a predetermined quantity of air, the outlet-pipes leading from the top and bottom of said supplemental tank, a valve-casing with which said pipes connect, a filling-pipe leading from said casing, a rotatable valve located therein, the air-inlet pipe leading from a valve-casing to the top and bottom of the supplemental tank, a pipe forming connection between the main tank or reservoir and said valve-casing, a rotatable valve located therein so as to control communication between the pipes, an air-actuated piston or head working in the supplemental tank, and of mechanism for imparting movement to the rotatable valves so as to open and close communication between the respective pipe connections.

2. In an apparatus of the described class, the combination with the main tank or reservoir, of a supplemental tank which is charged from the main tank or reservoir, valve mechanism for controlling the flow of air into the supplemental tank and from said tank to the filling tube or pipe which communicates with the tires of the bicycle, an air-actuated piston or head working in said supplemental tank, and of controlled mechanism for operating the valve mechanism in order to control the flow of air into and out of the supplemental tank.

3. In an apparatus of the described class, the combination with the main tank or reservoir, of the supplemental tank, pipe connections consisting of air-inlet and air-outlet pipes leading from the top and bottom of the supplemental tank, an air-feed pipe leading from the main tank or reservoir communicating with the air-inlet pipes, a filling-pipe communicating with the air-outlet pipes, valve mechanism forming connection between the respective pipes, an air-actuated piston or head working in the supplemental tank, and of controlled mechanism which actuates the valve mechanism.

4. In an apparatus of the described class, the combination with the main tank or reservoir, of the supplemental tank, the casing, shaft working therein, the valves mounted thereon, ported valve-casings within which the valves work, air-inlet pipes leading from one of said casings to the top and bottom of the supplemental tank, air-outlet pipes leading from the top and bottom of said tank and communicating with the other valve-casing, a pipe connection between the first-named casing and the main tank or reservoir, a filling-pipe leading from the other valve-casing, an air-actuated piston or head working in the supplemental tank, and of controlled mechanism which imparts rotation to the shaft carrying the valves in order to establish communication with the respective pipes.

5. In an apparatus of the described class, the combination with the main tank or reservoir, of the supplemental tank, air-inlet and air-outlet pipes leading from the top and bottom of said tank, an air-actuated piston or head working therein, and of valve mechanism for opening the lower air-outlet pipe and the upper air-inlet pipe while closing the upper air-outlet pipe and lower air-inlet pipe, or vice versa.

In testimony whereof I affix my signature, in presence of two witnesses, this 8th day of February, 1898.

CURTIS A. SHOPTAUGH.

Witnesses:
 N. A. ACKER,
 ELMER WICKES.